Oct. 11, 1938.   E. H. BRODEN   2,132,559
HANDLE FOR REELS
Filed March 1, 1937
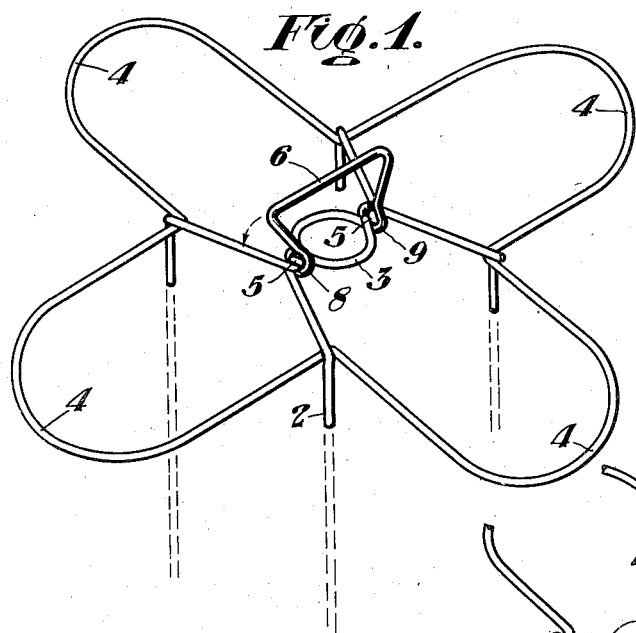
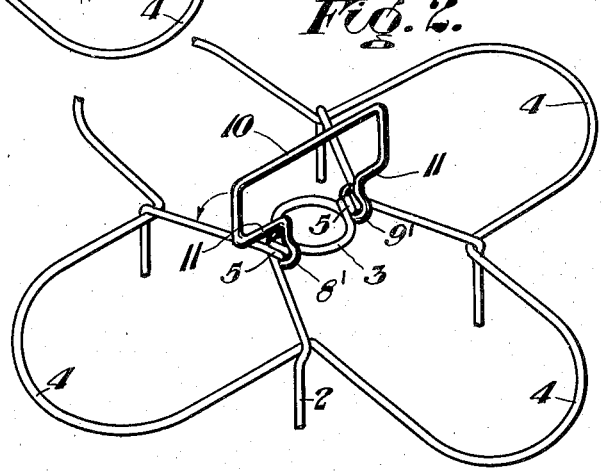
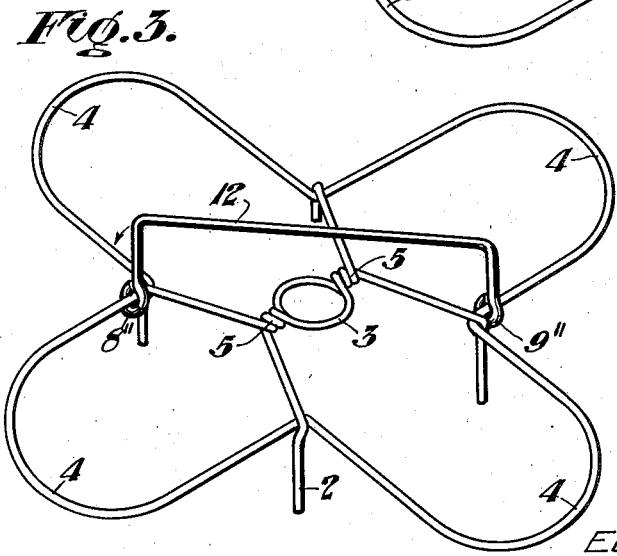
Inventor.
EDWIN H. BRODEN,
by his Attorneys.

Patented Oct. 11, 1938

2,132,559

UNITED STATES PATENT OFFICE 2,132,559

HANDLE FOR REELS

Edwin H. Broden, Swissvale, Pa., assignor to The American Steel and Wire Company of New Jersey, a corporation of New Jersey Application March 1, 1937, Serial No. 128,533

1 Claim. (Cl. 242—77)

This invention relates to handles for reels and more particularly relates to handles for reels that are adapted to carry barbed wire and the like.

Reels of this type are illustrated in Patent No. 1,259,725, to Charles I. Dailey, issued March 19, 1918. The handles, as contemplated by this invention, are adapted to be used with the above mentioned reel and other similar reels.

One of the objects of the present invention is to provide a bail-like handle which is strong and durable and which can be readily and inexpensively constructed.

Another object is to provide a handle which can be readily attached to or mounted on the standard form of reel and which will not interfere in any way with the storage of said reels, either in stock or during shipment thereof.

The above and further objects will be made apparent by referring to the following description and the accompanying drawing, in which:

Figure 1 is a perspective of one embodiment of the device of the invention attached to a reel;

Figure 2 is a view similar to Figure 1, showing a modification of the device of the invention; and Figure 3 is a view similar to Figures 1 and 2, and shows a further modification of the device of the invention.

Referring more particularly to the drawing, the numeral 2 designates generally a reel which has a cage-barrel 3 provided with reel heads 4 attached to the ends thereof. Preferably, the reel 2 is made solely of wire and the ends of the cage-barrel 3 are recessed or bent in so that an object can be received therein without increasing the width of the cage-barrel 3. For example, the cage-barrel 3 has intertwisted portions 5 forming the ends thereof which are bent inwardly, thus spacing the intertwisted portions 5 closer together than the outer extremities of the cage-barrel 3.

A handle 6 is pivotally connected to the reel 2 at the intertwisted portion 5. This handle is bent in the same direction near each end and formed into hooks 8 and 9 at the ends thereof. The hooks 8 and 9 are adapted to engage with the cage-barrel 3 and the handle 6 is so formed that the handle portion thereof is spaced from the reel 2 when in use. The handle 6, in all instances, is pivotally engaged with the cage-barrel 3 so that the handle 6 can be moved up against the reel 2 when not in use. As the ends of the cage-barrel 3 are bent inwardly, the handle 6 can be received in the recess which is so formed. However, the handle 6, which preferably is made of wire that is strong enough to support the reel 2 without being deformed, is so shaped that it does not require additional storage space even though the ends of the cage-barrel 3 are not provided with recesses. In every case the handle 6 is adapted to be placed flush with the reel 2 when not in use.

In Figure 2, a handle 10 which is a modification of the handle 6 is shown connected to the reel 2 by means of inwardly extending arm portions 11 having hook portions 8' and 9' formed on the ends thereof. The handle 10 is connected to the cage-barrel 3 and is of a slightly different design than the handle 6.

A handle 12 is illustrated in Figure 3. The handle 12 has hook portions 8" and 9" formed on the ends thereof which are pivotally engaged with the reel head 4 on opposite portions thereof. The handle 12 is particularly adapted for use when the reel 2 is heavily loaded as it is adapted to receive two men's hands therein. The handle 12 is so constructed and shaped that it is pulled away from the reel 2 when in use but fits snugly on the side of the reel 2 when not being used.

It will be appreciated that the exact design and connection of the handles to the reels, and the actual construction of the reels can vary widely without departing from the scope of the invention as defined by the following claim.

I claim:

A reel consisting of a cage-barrel provided with depressed centers and heads secured to the ends thereof, said barrel and said heads being composed solely of wire in combination with an open ended wire loop, said wire loop pivotally connected by its open ends to at least one end of said reel, said wire loop being constructed and arranged to provide a handle portion spaced from the end of said reel when in use and to fit in the depressed center of said cage-barrel when not in use.

EDWIN H. BRODEN.